United States Patent [19]

Martin et al.

[11] Patent Number: 4,640,728
[45] Date of Patent: Feb. 3, 1987

[54] METHOD OF JOINING FOAM PATTERNS FOR EVAPORATIVE CASTING PROCESS

[75] Inventors: Robert A. Martin, Northville; Thomas J. Heater, Garden City, both of Mich.

[73] Assignee: Ford Motor Company, Dearborn, Mich.

[21] Appl. No.: 877,595

[22] Filed: Jun. 23, 1986

Related U.S. Application Data

[62] Division of Ser. No. 772,817, Sep. 5, 1985.

[51] Int. Cl.⁴ .......................... B32B 31/04; B22C 7/02
[52] U.S. Cl. ................................. 156/245; 156/304.5; 164/45; 29/527.1; 29/DIG. 1; 29/DIG. 29; 264/221; 264/DIG. 44
[58] Field of Search .................. 164/45; 264/221, 317, 264/DIG. 44; 29/428, 527.1, DIG. 1, DIG. 29; 156/245, 304.5

[56] References Cited

U.S. PATENT DOCUMENTS 3,634,167 1/1972 Plontke ........................ 156/304.5 X
4,435,240 3/1984 Knaus et al. .................... 156/245 X
4,483,731 11/1984 Döhle et al. ........................ 156/245

FOREIGN PATENT DOCUMENTS 1481611 8/1977 United Kingdom ................ 156/245
2020603A 11/1979 United Kingdom ................ 156/245

Primary Examiner—Nicholas P. Godici
Assistant Examiner—J. Reed Batten, Jr.
Attorney, Agent, or Firm—Joseph W. Malleck; Roger L. May

[57] ABSTRACT

First and second clamshell-shaped foam members are mated, the first and second foam members meeting along exteriorly exposed joint margins defined by mateable surfaces extending along opposite sides of each of the members. At least one other foam member is nested totally within the mated assembly of the first and second members and nested without joint margins exposed to the exterior of the mated assembly. The surfaces enclosed within the mated assembly pilot the first, second and other members into mating relationship. The first and other members are adhesively bonded together and the second member is adhesively bonded to the assembly of the first and other member.

2 Claims, 7 Drawing Figures

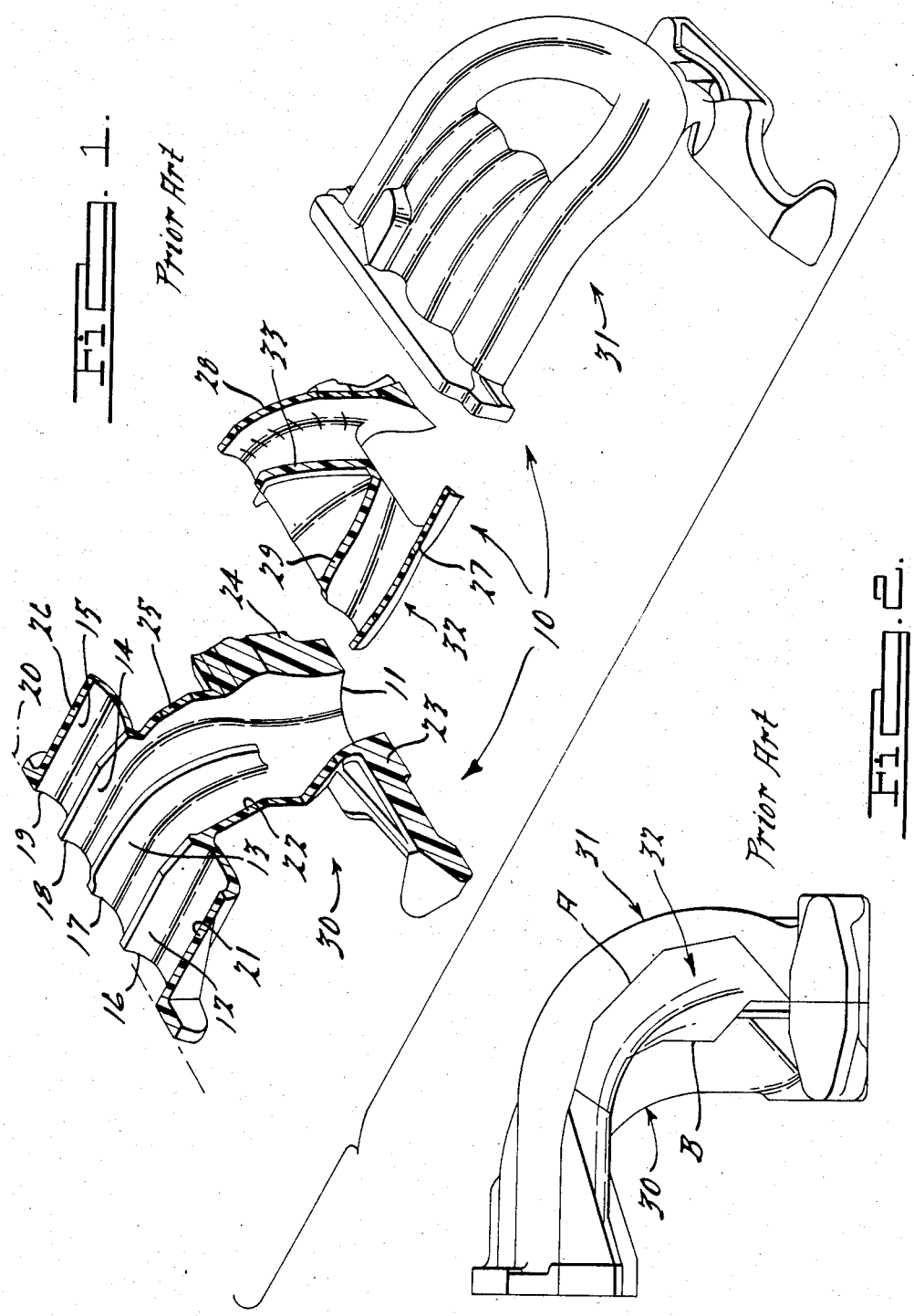

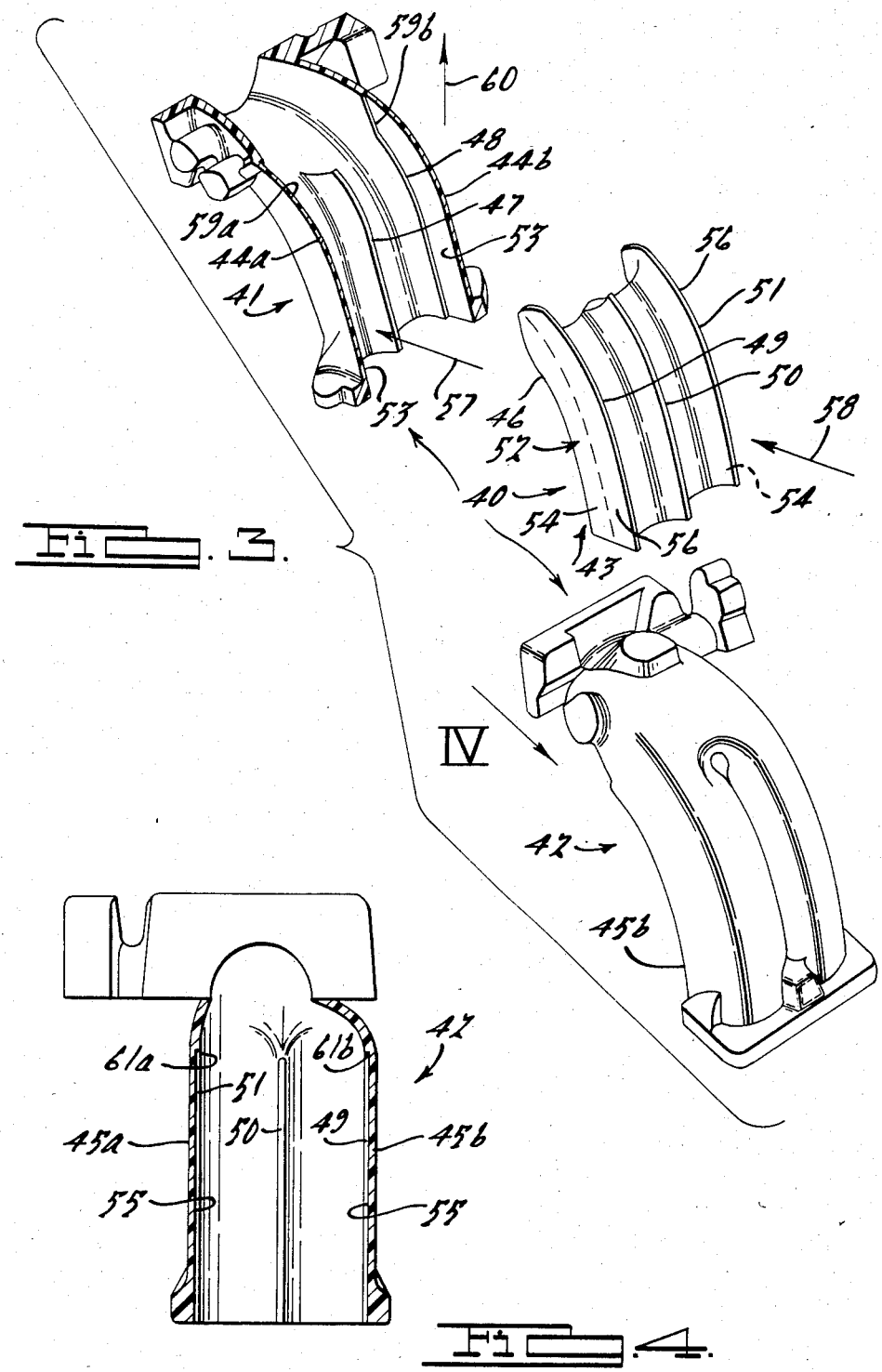

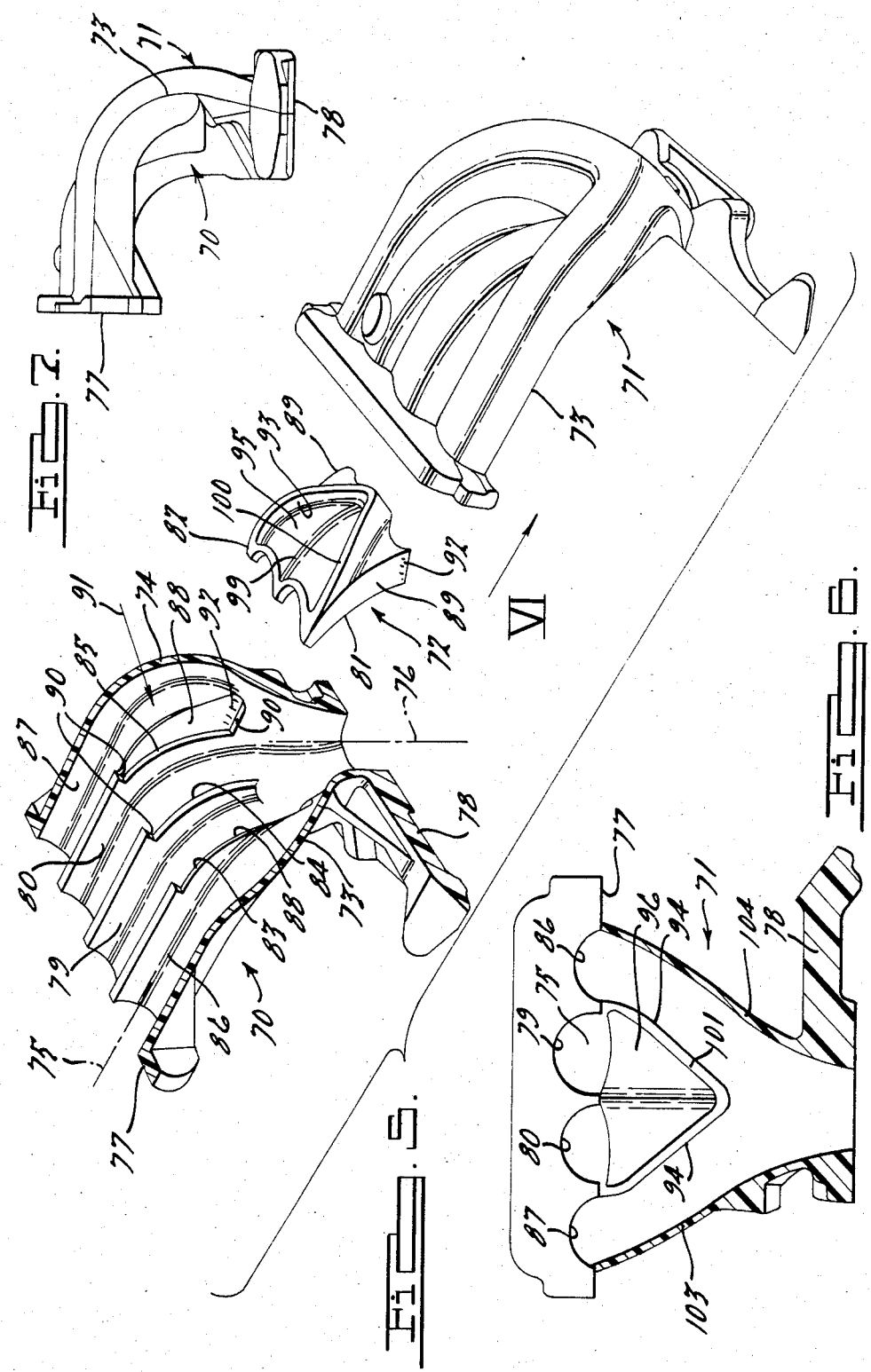

4,640,728

METHOD OF JOINING FOAM PATTERNS FOR EVAPORATIVE CASTING PROCESS

This is a division of application Ser. No. 772,817, filed Sept. 5, 1985.

TECHNICAL FIELD

This invention relates to the art of casting metals by use of consumable or evaporative patterns and, more particularly, to the construction of such patterns for making complex castings.

BACKGROUND OF INVENTION AND PRIOR ART STATEMENT

Use of foam patterns (comprised of polystyrene or polyurethane or polyethylene) in the casting of metals has been known for at least the past 20 years. During this period substantially all of such foam patterns have been of simple, unitary shapes. In a few instances, where a complex pattern was necessarily divided into parts to allow the foam parts to be die cast, such parts had to be joined together to complete the pattern.

The splitting of the entire pattern into parts is necessitated by the ability to define, by dies, all the surfaces of the pattern; die molding must allow the dies to be removed along a straight line direction and thus will not allow for undercut or return surfaces. When a pattern requires undercut or return surfaces, the pattern itself is split into at least three pattern parts to obtain the definition of such internally complex surfaces.

It has become the custom to divide such complex patterns along parting planes that pass through a maximum amount of the pattern material and create joining surfaces or joining margins along a substantial portion of the exterior of the pattern. In complex parts, these joining surfaces, or joining margins, are typically thin since the parting plane usually passes through thin walls of the pattern which are to define, in turn, thin cast metal walls.

Foam pattern parts have been joined together prior to insertion in the mold, either by solvent welding, such as illustrated in U.S. Pat. No. 3,675,708 (which unfortunately results in distortion of the welded surfaces), or hot melt adhesive bonding, such as shown in U.S. Pat. No. 4,243,093, which inherently requires the application of hot melt glue along straight, geometrically level lines or surfaces. Commercially available hot melt adhesive bonding equipment (which may be used for mass production joining of such foam pattern parts) is preferably limited to (a) dispensing an extruded liquid bead, or (b) printing the hot melt glue onto flat surfaces or straight margins by kissing a hot melt glue-holding platen against the margins which must receive glue. Since most of the hot melt adhesive employed by such equipment is parrafin based, it is necessarily heated to a temperature of about 260° F. to make it relatively fluid; such glue condition allows it to run off if deposited onto other than level surfaces or level lines, thereby severely complicating the joining process and detrimentally affecting the quality of the casting.

The integrity of the glue joints thus formed between several foam pattern parts is extremely important since it does affect the quality of the casting. Casting quality is affected because the absence of glue, or improperly applied glue at a joint, enables refractory wash (which is applied to the foam patterns after they have been formed and assembled, and prior to insertion into the metal casting mold) to seep into the glue joint. The presence of this wash at the foam part joining interfaces results in an absence of a thin layer of metal in the final casting at such critical areas, creating particularly small defects that must be repaired or the casting scrapped.

It would be helpful if a method of defining the foam pattern parts could be devised so that much of the externally created glue line on the pattern can be reduced in length allowing most of the glue lines, for joining, to be maintained internally within the pattern and not subject to the problem of refractory wash seepage; defects can be tolerated at these interior stations of the casting.

Another problem exists with respect to automating the assembly of the pattern parts, one of such parts having received the hot melt adhesive; it is difficult to bring the pattern parts together acccurately on a consistent basis without some supplementary means to pilot the pattern parts into proper position. In the assembly of a complex pattern, where three or more parts are assembled together, this becomes difficult since an interior part does not have the benefit of mold pins to assist such a union.

SUMMARY OF THE INVENTION

The invention is both an assembly of complex, consumable foam pattern parts for use in the evaporative pattern metal casting process as well as a method for making such pattern assembly. The pattern assembly is comprised of: (a) mating first and second clamshell-shaped foam members, the first and second foam members meeting along exteriorly exposed joint margins defined by mateable surfaces extending along opposite sides of each of the members; (b) at least one other foam member nestable totally within the mated assembly of the first and second members and nestable without joint margins exposed to the exterior of the mated assembly; (c) surface means enclosed within the mated assembly for piloting the first, second and other members into mating relationship; and (d) adhesive means bonding the first and other members together and bonding the second member to the assembly of the first and other members.

Preferably, the exterior joint of the assembly is reduced linearly by about at least 20% compared to an assembly where all the pattern parts have most surfaces exposed to the exterior of said assembly. Preferably, the use of stepped pattern part joints is eliminated, obviating the difficulty in applying glue uniformly to such serrations, and also because stepped joints greatly increase the difficulty in obtaining accurate match-up of mating margins to be bonded due to tooling variations and glue or foam part density variability.

Preferably, the surface means for piloting the first, second and other member comprises: (a) interiorly disposed mating planar surfaces on the first and other member effective to constitute a double-ply foam wall when mated, and (b) interiorly disposed second pilot surfaces on the second and other member effective, when mated, to constitute a double-ply foam wall. Preferably, the assembly may additionally comprise stop means to limit movement of the first pilot surfaces in a first direction along the pilot surfaces and transverse to the first direction, and stop means to limit movement of the second pilot surfaces in a similar manner.

Preferably, the interiorly disposed first and second pilot surfaces additionally comprise, respectively, first and second mating wedging surfaces to accurately align the pilot surfaces.

The method of this invention comprises: (a) molding first, second and third consumable foam pattern segments, the first and second pattern segments being mateable and effective to meet along exteriorly dipsosed joint margins defined by mateable surfaces extending along opposite sides of each of the first and second segments and a third pattern segment nestable totally within the assembly of the first and second pattern segments without joint margins exposed to the mated assembly, the first and second segments having interiorly disposed first pilot surfaces effective when mated to constitute a double-ply foam wall, the first and third segments being molded with mateable interiorly disposed first pilot surfaces effective to constitute a double-ply foam wall when mated, and the second and third segments have interiorly disposed second pilot surfaces effective when mated to constitute a double-ply wall, the pilot surfaces having stop means to limit movement of the pilot surfaces; (b) mating the third segment with the first segment by moving the first pilot surfaces together along each other until they bottom at the first stop means; and (c) mating the second segment with the assembly of the third and first members by moving the second member along the second pilot surfaces until the second stop means is bottomed.

SUMMARY OF THE DRAWINGS

FIG. 1 is an exploded perspective view of one approach to making a multiple segment foam pattern for a complex casting, such approach being in conformity with conventional pattern making techniques and not meeting the criteria of this invention;

FIG. 2 is a side elevational view of the exploded parts of FIG. 1 shown in the closed position;

FIG. 3 is an exploded perspective view of one embodiment of this invention;

FIG. 4 is a view of the inside of pattern segment 42 of FIG. 3 taken in the direction of the arrow IV as indicated in FIG. 3;

FIG. 5 is an exploded perspective view of another embodiment of this invention viewed from a first direction;

FIG. 6 is a view of one pattern segment of FIG. 5 taken in the direction of the arrow VI as indicated in FIG. 5; and FIG. 7 is an elevated side view of the exploded parts in FIG. 5 shown in closed position.

BEST MODE AND DETAILED DESCRIPTION

The evaporative casting process employs an expendable or consumable foam replica of the part to be cast. Many complex castings, such as an intake manifold for an engine, requires three or more foam members which are segments of the overall pattern to produce the product shape. The individual foam segments are glued together to make up the complete foam replica, which is then coated with a refractory wash coating prior to pouring of the metal into the metal casting mold using such pattern. The integrity of the glue joints between these foam segments and exposed to the exterior of the pattern affects the quality of the casting. An absence of glue, or glue which is improperly applied or misplaced, enables the refractory wash to seep into the glue joint. The presence of this refractory wash in the foam to foam margin interface results in an absence of metal, creating a defect that must be repaired in the final metal casting. Such repair is usually carried out by impregnation, welding, or eventually scrapping the entire metal casting.

This invention discloses a foam pattern construction or assembly, and discloses a method for making metal casting utilizing such pattern assembly, which greatly reduces the length of the exterior located glue joint, thereby directly reducing the potential for glue line defects.

If conventional pattern making practices were to be used to establish foam segments for a casting pattern, the resultant glue joints will not be optimum. For example, as shown in FIG. 1, a foam pattern 10 was developed for casting an intake manifold of aluminum metal, the intake manifold being designed for a four-cylinder engine requiring four conduits to conduct the intake air/fuel mixture to the cylinders from a common air supply. This particular intake manifold utilized an entrance or mouth 11 from which four air channels 12-13-14-15 extended therefrom and terminated in four aligned exit openings 16-17-18-19 having their axes aligned along a straight line 20. Conventional pattern making techniques require the pattern be divided into parts for internal definition, the pattern being sliced much like a loaf of bread, that is, the cut extends across the entire mass of the material. In this case (see FIG. 2), a curved slice A is made entirely through the widest part of the pattern defining segments 30 and 31, and a supplementary slice B is made entirely through another wide section of the pattern, slice B joining with slice A to define a middle segment 32.

The reason for such slices is as follows. One side of most of the channels is defined by one pattern segment creaed by slice A, and substantially all of the sides of the other channels are defined by an opposing segment. However, where the channels tend to diverge from the inlet 11, the pattern develops mass in two directions. To define internal surfaces, a middle segment is required and is set off by slice B. All the parting planes made by the slices extend straight through the body of the pattern resulting in exteriorly exposed joint margins identified as 21-22-23-24-25-26 on segment 30 (and a compliment of the same joint margins on segment 31), and joint margins 27-28-29-33 on segment 32. This particular pattern design had a total length of joint margins for gluing of 71 inches, of which 57 inches were externally exposed glue margins which can result in external defects; that is, leaks to the outside of the manifold. Internal joint margins are not particularly critical since any slight absence of metal does not result in an external leak and therefore can be tolerated without repairs. It is the exernally exposed joint margins that create a problem resulting in casting defects. Thus, if the externally exposed joint margins can be reduced or substantially elminated, the defects are proportionately reduced. Notice that to obtain proper internal surface definition, the externally exposed joint margins are a series of zigzag or stepped margins and are not along a continuous geometrical curve; this complicates the problem of applying a uniform deposition of an extruded liquid or foamed glue bead in mass production apparatus techniques. The chance for lateral mismatch is significant because there are no surfaces that guide or pilot the particular segmental members together. The joint margins for gluing must be simple, smooth, and not complex.

The molding process for defining the foam pattern segments is an inherent limitation on the shape of the segments. Internal passages and undercut surfaces must be defined by dies which must be withdrawn in one linear direction determined by the die molding equipment assembly.

Turning to FIG. 3, segments of a complex consumable foam pattern assembly are shown, which when glued together will be used in an evaporative pattern metal casting process for making a cast aluminum intake manifold.

The assembly 40 is comprised of clamshell-shaped mating foam segments (or members) 41 and 42 which meet along exteriorly exposed joint margins 44a and 44b and 45a and 45b defined by mateable narrow surfaces extending along opposite sides of each of the segments. A third foam segment 43 is nestable totally within the mated assembly of segments 41 and 42; the third segment is joined at mating margins 46-47-48 to segment 41 and at mating margins 49-50-51 to segment 42.

The segments carry surface means 52, which is enclosed within the assembly, for piloting the segments into accurate mating relationship. The surface means 52 comprises interiorly disposed pilot surfaces 53 on segment 41 and surfaces 54 on segment 43 for piloting segments 41-43 together; when segments 41-43 are mated, the surfaces 53 and 54 will constitute a double-ply foam wall; surfaces 53 and 54 mate on both sides of segment 43. Surface means 52 also comprises other pilot surfaces 55 on segment 42 and surfaces 56 on segment 43 for piloting segments 42 and 43 together; again, when segments 42 and 43 are mated, the surfaces 55 and 56 will constitute a double-ply foam wall. Surfaces 54 and 56 lay on opposite sides of the dotted line shown in FIG. 3.

The surface means 52 additionally comprises stops 46-47-48 (which are mating margins) to limit movement of pilot surfaces 54 relative to surfaces 53 when the segment 43 is inserted into segment 41 in a first direction 57 along the surfaces. Stops 49-50-51 (which are mating margins) limit movement of pilot surfaces 56 relative to surfaces 55 when segment 42 is inserted onto segment 43 in a direction 58 along the surfaces 56 and 55. The surface means also has stop shoulders 59a and 59b on segment 41 to limit movement of the surfaces 54 and 53 in a direction 60 transverse to direction 57 and stop shoulders 61a and 61b on segment 42 to limit movement of surfaces 55 and 56 in a direction transverse to direction 58.

Liquid adhesive is applied first to margins 59a and 59b and to margins 46-47-48; segment 43 is then inserted into segment 41 with surfaces 53 and 54 piloting the movement and margins 46-47-48 stopping the movement in one direction with stop shoulders 59a and 59b stopping the movement in the other direction.

Then liquid adhesive is applied to margins 44a and 44b of segment 41 and margins 49-50-51 of segment 43. Segment 42 is then inserted onto the assembly of segments of 41 and 43, the sliding inserting movement of surfaces 55 and 56 being limited by margins 49-50-51 and stop shoulders 61a and 61b.

The open time for liquid adhesives may be relatively short requiring quick, foolproof assembly as made possible by this invention.

A preferred embodiment to reduce the extended exteriorly exposed joint margins and to elminate the problem of locating all segments relative to each other is shown in FIGS. 5–7. Mating clamshell-shaped foam segments 70 and 71 (or members) are defined and hereafter referred to as first and second members. The first and second members 70 and 71 meet along exteriorly exposed joint margins 73 and 74, which margins separate the exterior walls of the pattern by way of a surface which curves along the midsection of the two outer channels. The two narrow curved margins 73 and 74, commensurate in width with the pattern wall through which it is bisected, are spaced at opposite sides of the segments 70 and 71. Margins 73 and 74 are to mate with margins 103 and 104 on segment 71.

The first and second segmental members meet along a curved plane, which plane is defined by a plurality of parallel axes, each being perpendicular or transverse to the axis 75 of the inlet and axis 76 outlet openings of the manifold pattern. The meeting plane causes the portions of the segmental members to meet along thin wall margins as severed by such plane. The thin wall joint margins exposed to the exterior of the mated assembly (here 73 and 74) are substantially reduced in length and extend through the midsection of the two side channels of the manifold. The division of the interior channels of the manifold is not exposed to the exterior. The width of wall margins 73 and 74 is approximately 0.188 of an inch.

The body of the casting pattern adjacent the inlet opening and the outlet openings is somewhat enlarged to provide for a mass of material for mounting the resultant mating part, and thus permits the foam pattern to have planar surface 77 and 78 adjacent such openings. However, the joining of the pattern segments is principally along the thin wall joint margins 73 and 74.

Another foam segment 72 is defined which is nestable totally within the assembly of the first and second clamshell-shaped members. The enclosed member 72 is totally enveloped and has no projection to the exterior of the assembly of the first and second members. One side 81 of segment 72 is defined by a first curved plane which meets generally with the midsection of the interior channels 79 an 80. Joint margins 83-84-85 lay in the first curved plane. The opposite side 82 is defined by a second curved plane which severs the midsection of the exterior (outside) channels 86 and 87, which second plane aligns with the curved plane defining the first segment 70.

Segment 72 and segment 70 have mating first pilot surfaces 88 and 89 in the form of flat side walls, which pilot surfaces 88 an 89 face each other when mated. Such pilot surfaces are brought into engagement by sliding the segment 72 between the pair of pilot surfaces 88 on the segment 70, such surfaces being spaced apart accurately so that they provide a slight frictional interengagement when so mated.

First stop means (in the form of joint margins 83-84-85) meet the inside curved plane 81 of segment 72 to limit the sliding movement of segment 72 in one direction 91. Stop shoulders 90 are provided at the extremities of margins 83-84-85 to limit the sliding motion of the pilot surfaces in a direction transverse to direction 91. To further accurately position segment 72 relative to segment 70, first mating wedging surfaces 92 are provided on such segments and are adpated to guide the segments together as segment 72 is slightly moved downwardly as it is slid into position toward segment 70.

To bring segment 71 into accurate alignment with the assembly of segments 70 and 72, second mating pilot surfaces 93 are provided which comprise wedging surfaces defined as generally a V configuration on segment 72. The surfaces 93 extend along the inside of the pattern wall 95 and define the two outer channels 86-87.

Complimentary wedging surfaces 94 on segment 71 (forming a V), when mated to the first curved wedging surfaces, define a double-ply foam wall. Second wedging surfaces 95 are provided on segment 72, which surfaces 95 form the outer side of the inner channels 79 and 80 along one portion thereof; complimentary mating wedging surfaces 96 are provided on the segment 71 and, when mated, form a double-ply wall. The wedging surfaes 95 result in a meeting at the crevice 99 between the two inner channels and the natural curvature of the outer surface of those tubular channels.

Additionally, segments 71 and 72 have second stop means which are the mating joint margins 100 and 101 resulting from severance of the overall pattern at the curved separation plane 73. Thus, segment 71 is brought into accurate alignment with the segment 72 by virtue of the wedging surfaces 93 and 94 and 95 and 96, said pairs being in opposed orientation to each other; as segment 72 is slid into and slighly down on the segment 72 (as segment 72 sits on the segment 70), the thin joint margins 83-84-85 are accurately placed into abutting relationship.

Prior to assembling the segments of FIG. 5, liquid glue is deposited as an extruded bead onto the mating joint margins 73-74-83-84-85-101. Either a paraffin based glue which has a melting temperature of about 260° F. or greater can be utilized, or a foam hot melting adhesive may be employed which may be made from a polypropylene base and which has a melting temperature of 325° F. or greater; however, in the foam condition the glue possesses a surface temperature of less than 160° for an extended period. An example of the type of hot melt adhesive that may be employed is Eastobond (a trademark of Eastman Kodak Co.) having a model No. of A-148S; such hot melt adhesive is designed for bonding polystyrene with an extremely high bond strength. The Eastobond glue is melted in a tank, grid melter, or a bulk melter, and is fed by way of a gear pump or piston pump to a feeding mechanism and applied as an extruded bead through a nozzle commensurate with the width of the joint margin wall of the foam pattern. The application temperature of such Eastobond glue is usually between 350°-375° F. (177°-191° C.); the adhesive has a viscosity at 350° F. of 42cP, a heat stability (change in viscosity after 100 hours at 350° F.) of about 15%, a density at 73° F. of about 0.89 gm/cm$^3$, and a flash point of about 550° F. Such foamed glue will have an open time of at least 40 seconds; open time is measured from the moment the bead is placed on one of the pattern segments to the time the other pattern segment is placed in contact with the mating pattern segment.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:
1. A method of assembling foam pattern segments into a unitary assembly, comprising:
   (a) molding first, second and thrid consumable foam pattern segments, said first and second pattern segments being mateable and effective to meet along exteriorly disposed jont margins defined by mateable surfaces extending along opposite sides of each of said first and second segments, and a third pattern segment nestable totally within the assembly of said first and second segments and nestable without joint margins exposed to the exterior of the mated asssembly, said first and third segments being molded with interiorly disposed pilot surfaces effective to constitute a double-ply foam wall when mated, said first and third segments being molded with interiorly disposed second pilot surfaces effective to constitute a double-ply foam wall when mated, said pilot surfaces also having stop means to limit movement of the pilot surfaces;
   (b) mating said first segment with said third segment by moving said first pilot surfaces together along the plane of said surfaces until said stop means is bottomed out; and
   (c) mating said second segment with the assembly of said third and first segments by moving said second means is bottomed out.
2. The method as in claim 1 further comprising, prior to step (b), applying a liquid adhesive to said joint margins.

* * * * *